United States Patent
Siddique et al.

(10) Patent No.: US 12,520,052 B2
(45) Date of Patent: Jan. 6, 2026

(54) ELECTRICALLY SWITCHABLE PHOTONIC MATERIAL AND METHOD OF FORMING

(71) Applicants: Samsung Electronics Co., Ltd., Suwon-si (KR); Massachusetts Institute of Technology, Cambridge, MA (US)

(72) Inventors: Radwanul Hasan Siddique, Monrovia, CA (US); Youngzoon Yoon, Kyonggi-do (KR); Mathias Kolle, Hull, MA (US); Benjamin Miller, Cambridge, MA (US)

(73) Assignees: SAMSUNG ELECTRONICS CO., LTD. (KR); MASSACHUSETTS INSTITUTE OF TECHNOLOGY, Cambridge, MA (US)

(\*) Notice: Subject to any disclaimer, the term of this patent is extended or adjusted under 35 U.S.C. 154(b) by 75 days.

(21) Appl. No.: 18/243,093

(22) Filed: Sep. 6, 2023

(65) Prior Publication Data
US 2024/0380992 A1 Nov. 14, 2024

Related U.S. Application Data

(60) Provisional application No. 63/465,807, filed on May 11, 2023.

(51) Int. Cl.
| | |
|---|---|
| *H04N 25/13* | (2023.01) |
| *G02F 1/1334* | (2006.01) |
| *H04N 9/64* | (2023.01) |
| *H04N 23/84* | (2023.01) |

(52) U.S. Cl.
CPC ....... *H04N 25/134* (2023.01); *G02F 1/13342* (2013.01); *H04N 9/646* (2013.01); *H04N 23/843* (2023.01); *H04N 2209/046* (2013.01)

(58) Field of Classification Search
None
See application file for complete search history.

(56) References Cited

U.S. PATENT DOCUMENTS

| | | | |
|---|---|---|---|
| 8,755,625 B2* | 6/2014 | Singh | H04N 9/646 382/275 |
| 2003/0214690 A1 | 11/2003 | Escuti et al. | |
| 2010/0309315 A1* | 12/2010 | Hogasten | H04N 5/33 348/E5.09 |
| 2014/0078459 A1* | 3/2014 | Kim | H04N 25/134 349/193 |
| 2014/0354996 A1 | 12/2014 | Fontecchio et al. | |
| 2022/0155506 A1* | 5/2022 | Kolle | G02B 1/005 |
| 2022/0232156 A1* | 7/2022 | Skorka | H04N 23/73 |

OTHER PUBLICATIONS

European Partial Search Report for Application No. 24174538.9, mailed Oct. 22, 2024.

\* cited by examiner

*Primary Examiner* — Quan Pham
(74) *Attorney, Agent, or Firm* — Renaissance IP Law Group LLP

(57) ABSTRACT

A photonic device including a filter comprising an electrically switchable array, wherein the electrically switchable array includes alternating layers of polymer and polymer-dispersed liquid crystal, wherein the electrically switchable array is tunable under an applied electric field.

6 Claims, 11 Drawing Sheets

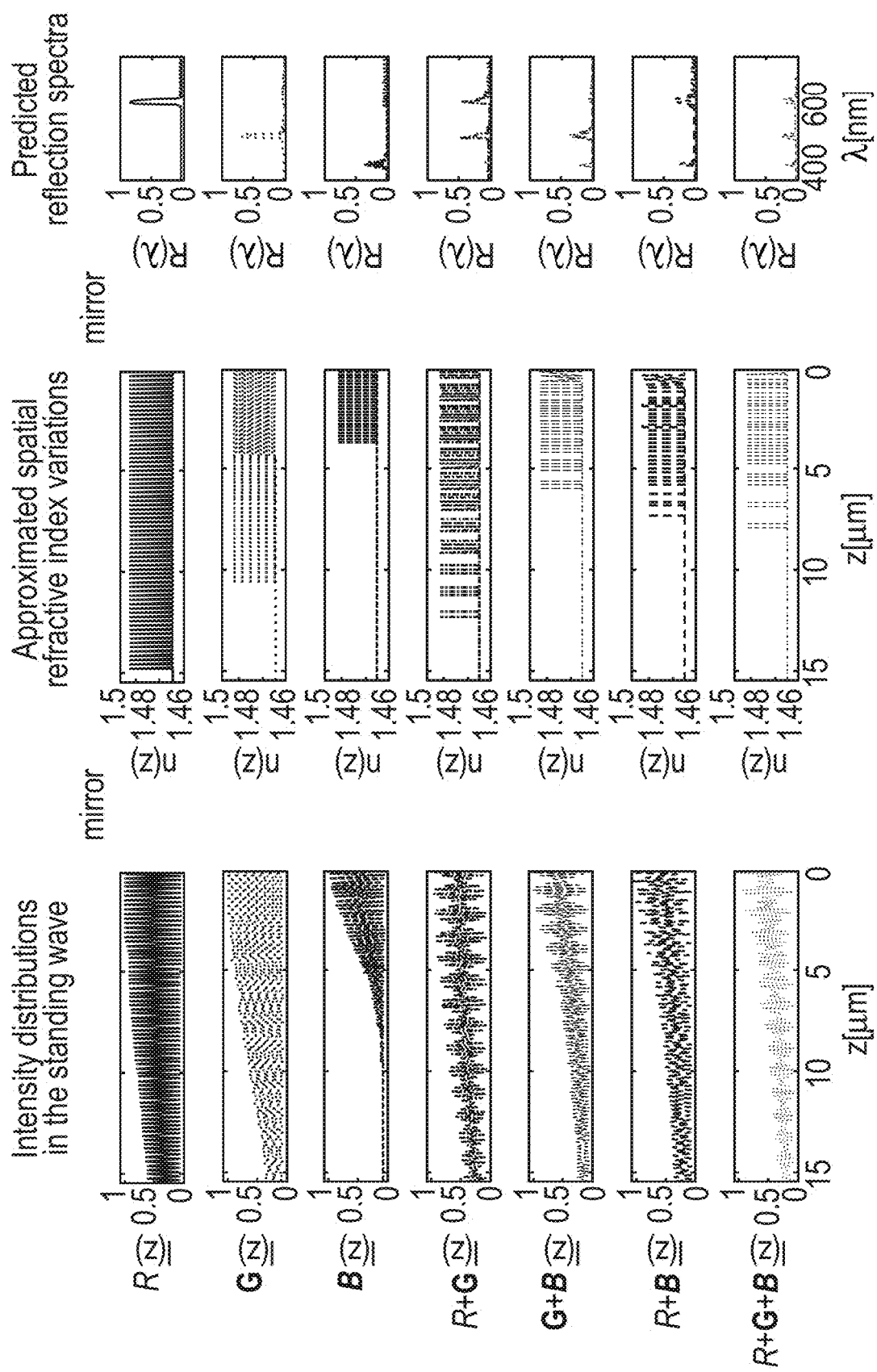

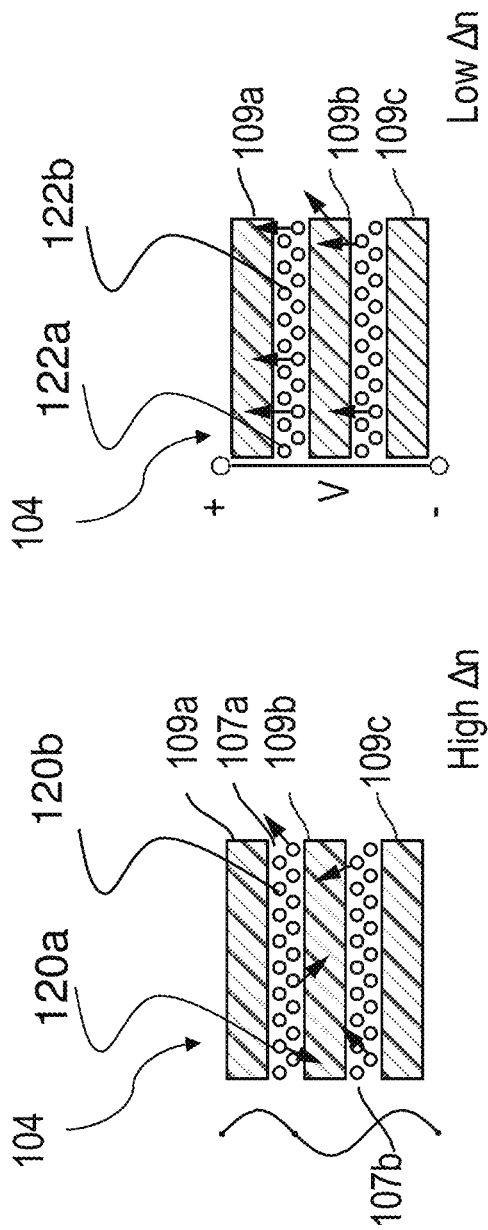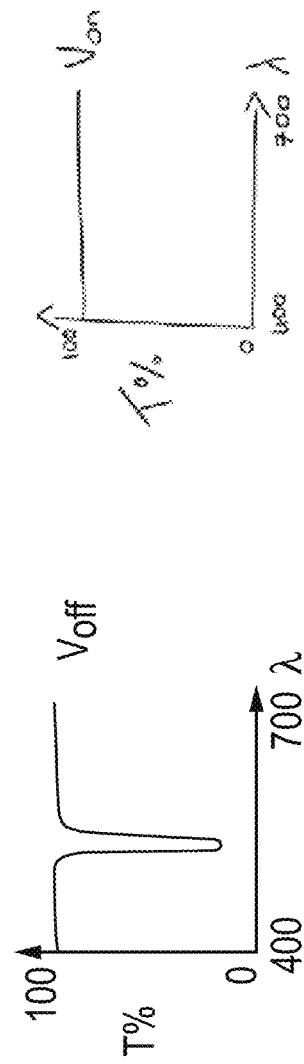

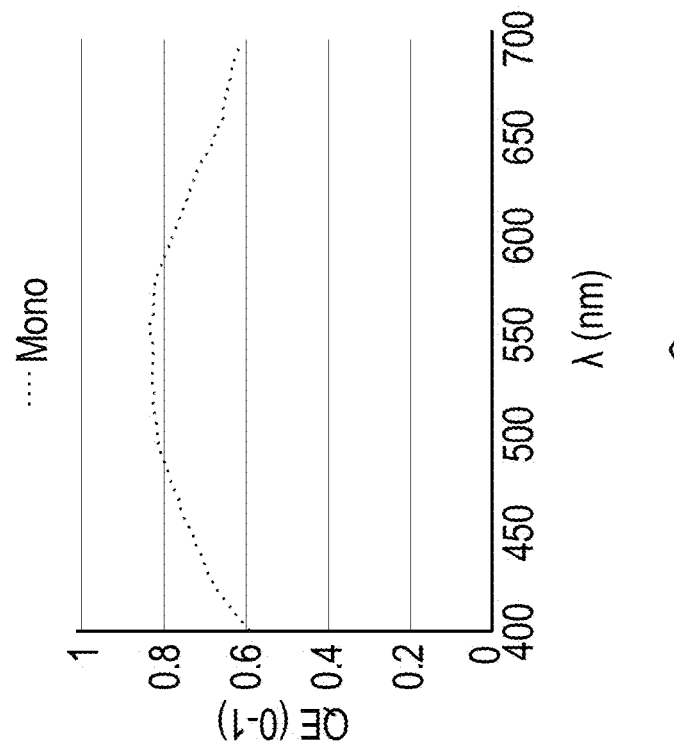
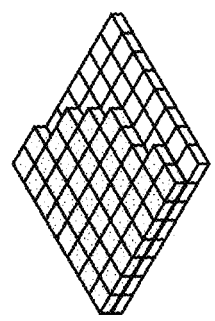
FIGURE 5B
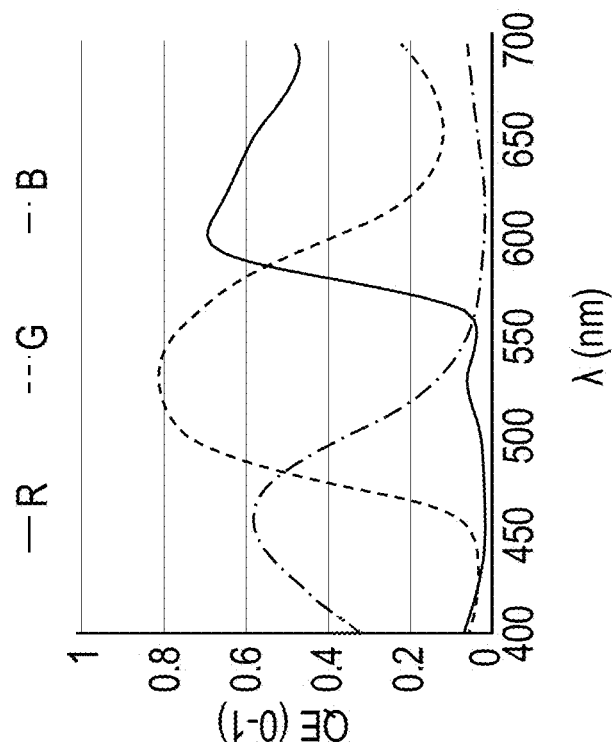
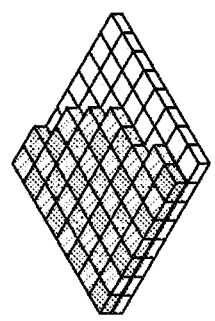
FIGURE 5A

ELECTRICALLY SWITCHABLE PHOTONIC MATERIAL AND METHOD OF FORMING

CROSS-REFERENCE TO THE RELATED APPLICATION

This application is based on and claims priority from U.S. Provisional Patent Application Ser. No. 63/465,807, entitled "Electrically Switchable Photonic Device and Method of Forming", filed in the United States Patent and Trademark Office on May 11, 2023, the disclosure of which is incorporated herein by reference in all its entirety.

FIELD

Apparatuses and methods related to the disclosure relate to the field of imaging devices, and more particularly to imaging sensors.

BACKGROUND

Image sensors are used in cameras and other imaging devices to capture images. In a typical imaging device, light enters through an opening (aperture) at one end of the imaging device and is directed to an image sensor by an optical element such as a lens. In most imaging devices, one or more layers of optical elements are placed between the aperture and the image sensor to focus light onto the image sensor. The image sensor consists of pixels that generate signals upon receiving light via the optical element. Commonly used image sensors include CCD (charge-coupled device) image sensors and CMOS (complementary metal-oxide-semiconductor) sensors.

Filters are often employed in the image sensor to selectively transmit light of certain wavelengths onto pixels. A Bayer filter mosaic is often formed on the image sensor. The Bayer filter is a color filter array that arranges one of the RGB color filters on each of the detector pixels. The Bayer filter pattern includes 50% green filters, 25% red filters and 25% blue filters. Since each pixel generates a signal representing strength of a color component in the incident light and not the full range of colors, demosaicing is performed to interpolate a set of red, green and blue values for each image pixel.

The image sensors are subject to various performance constraints. The performance constraints for the image sensors include, among others, dynamic range, signal to noise (SNR) ratio and low light sensitivity. The dynamic range is defined as the ratio of the maximum possible signal that can be captured by a pixel to the total noise signal. Typically, the well capacity of an image sensor limits the maximum possible signal that can be captured by the image sensor. The maximum possible signal in turn is dependent on the strength of the incident illumination and the duration of exposure (e.g., integration time, and shutter width).

The signal to noise ratio (SNR) of a captured image is, to a great extent, a measure of image quality. In general, as more light is captured by the pixel, the higher the SNR. The SNR of a captured image is usually related to the light gathering capability of the pixel.

Generally, Bayer filter sensors decrease an imaging system's light sensitivity. At low light levels, each pixel's light gathering capability is constrained by the low signal levels incident upon each pixel. In addition, the color filters over the pixel further diminish the signal level reaching the pixel. IR (Infrared) filters also reduce the photo-response from near-IR signals, which can carry valuable information.

Various approaches improving low-light photo and video capture have been proposed to increase the light capture, SNR, and image quality even at low signal levels. Within the smartphone market, camera performance has become a key metric. Even moderate differences in image quality between smartphone models and brands can affect a consumer's purchasing decision.

Due to the small size of smartphone image sensors, the amount of light they can capture is limited, in turn limiting their ability to be used in low-light photo and video applications. To compensate for this, either exposure times can be increased or multiple noisy images can be stacked. However, this often leads to blurring and/or other image artifacts, as well as making the overall frame rate too slow for low light video capture. As such, there is a persistent need for filters that maximize light capture in low light levels, while also providing color information.

Although there have been improvements to the light sensitivity of CMOS sensors, this has repeatedly been shown to be a complex, slow, and expensive process. Another approach that has been used is an integration of larger CMOS sensors and lenses, however, there are strong constraints on the size of the final device. Finally, applying computational photography approaches, such as capturing multiple lower-quality images and combining them has also been suggested. However, this process is slow and susceptible to image defects.

Information disclosed in this Background section has already been known to or derived by the inventors before or during the process of achieving the embodiments of the present application, or is technical information acquired in the process of achieving the embodiments. Therefore, it may contain information that does not form the prior art that is already known to the public.

SUMMARY

Disclosed herein are devices and methods intended to address the shortcomings in the art and may provide additional or alternative advantages as well.

(A1) In one embodiment, a photonic device is disclosed herein. The photonic device includes a filter comprising an electrically switchable array, wherein the electrically switchable array includes: alternating layers of polymer and polymer-dispersed liquid crystal, wherein the electrically switchable array is tunable under an applied electric field.

(A2) The photonic device of (A1), wherein the alternating layers of polymer and polymer dispersed liquid crystal have distinctly different refractive index variations, wherein the refractive index variations are distributed Bragg reflectors.

(A3) The photonic device of claim (A2), wherein: (a) at zero applied voltage the filter generates a high refractive index contrast between the polymer layers and the polymer-dispersed liquid crystal layers, wherein at zero applied voltage the filter is strongly reflective in a wavelength range determined by the structural period of the alternating layers; and (b) applying voltage greater than zero across the filter leads to a suppression of the refractive index contrast, wherein at a voltage greater than zero the filter is transparent in a previously reflected wavelength range.

(A4) The photonic device of (A3), wherein the filter is configured to: capture a color image when the filter is switched off; and capture a monochrome image when the filter is switched on.

(A5) The photonic device of (A1), wherein fabricating the filter includes: exposing a homogeneous liquid mixture comprising of holographic polymer and liquid crystal to a light source, generating periodic light fields, generating, from the periodic light fields, liquid-liquid phase separation of the polymer-dispersed liquid crystal and simultaneously generating cross-linking of the polymer layer.

(A6) The photonic device of (A1), wherein fabricating the filter includes: using spatially incoherent light to generate a standing wave pattern in the homogeneous liquid mixture, wherein the homogeneous liquid mixture is a precursor mixture including a monomer, photoinitiator and liquid crystal.

(B1) A method of imaging, the method including imaging an initial scene in a first frame with a Bayer filter to receive RGB values, imaging the initial scene in a second frame with the bayer filter turned off to receive light intensity values, converting the RGB values of the first frame to Y'CrCb values, removing the Y channel in the Y'CrCb frame to form a CrCb frame, subsampling the CrCb frame to form a subframe, and combining the CrCb subframe and the second frame to reconstruct the initial scene.

BRIEF DESCRIPTION OF DRAWINGS

Example embodiments of the inventive concept will be more clearly understood from the following detailed description taken in conjunction with the accompanying drawings in which:

FIG. 1B depicts intensity distribution in the standing wave, approximated spatial refractive index variations and the predicted reflection spectra, according to an example embodiment of the present disclosure.

FIG. 1C is an approximated spatial refractive index distribution of the nanoscale refractive index variations of a photonic structure patterned by the standing waves depicted in FIG. 1B.

FIG. 1D displays a predicted reflection spectra of photonic structures with the refractive index distribution shown in FIG. 1C inscribed with light fields that exhibit the light intensity distributions depicted in the same rows in FIG. 1B.

FIGS. 2A-2D depict turning the electrically switchable filter off and on, and the corresponding transmission spectra, according to an example embodiment of the present disclosure.

FIGS. 5A-5B depict sensitivity curves of a color image and monochrome image, according to an example embodiment of the present disclosure.

DETAILED DESCRIPTION OF EXAMPLE EMBODIMENTS

The detailed description set forth below in connection with the appended drawings is intended as a description of some example embodiments of a system and a method for image capture, in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

The description herein discloses, among other aspects, an RGB image sensor to capture more light, by integrating a structurally colored Bayer filter which can be switched on and off electronically. This allows the recording of pairs of color and monochrome images, which can be recombined into a single color image with higher SNR in low light level capture scenarios than can be achieved with conventional static Bayer filters. This will improve the quality and frame rate of low-light image and video capture.

As will be discussed in greater details, the advantage of our approach may be, among other aspects, a significant improvement in the SNR of arrangements of optical filters and CMOS sensors without the complex, slow, and expensive process of improving the underlying CMOS materials. This is method may be combined with computational photography approaches, but due to higher SNRs and the fewer images required is faster and less prone to image defects.

Described in more detail here is the design and manufacturing process of a structurally colored Bayer filter which can be turned on and off electronically, capturing pairs of color and monochrome images. Also described herein is a method to combine the captured image pairs into a single color image. In some embodiments, this method provides an over 50% improvement in image acquisition time compared to existing approaches, reducing blurring and artifacts, and allowing low-light video capture.

Figure 1A:
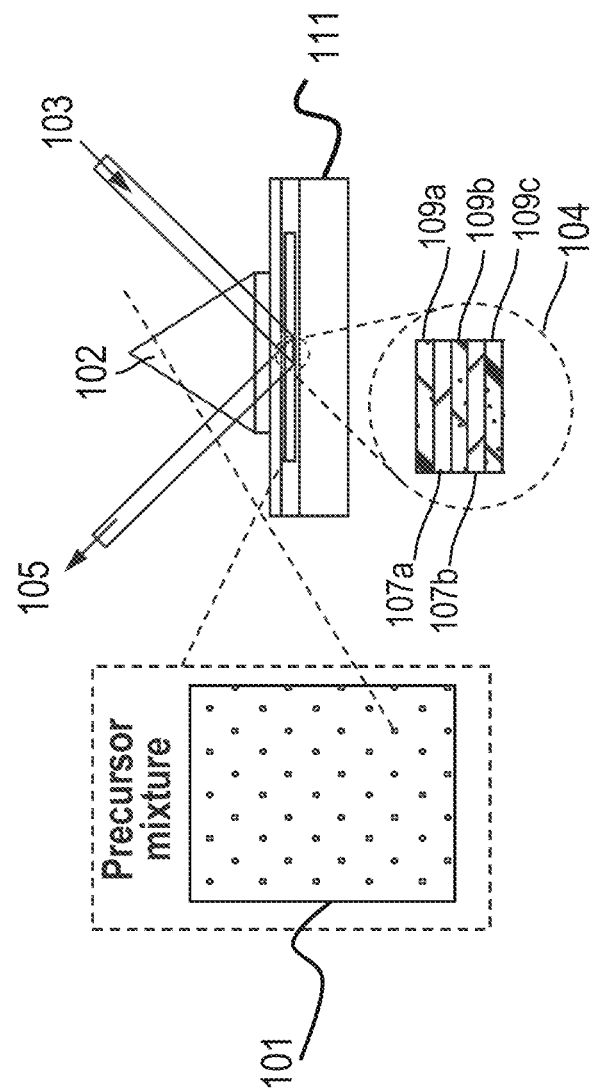
FIG. 1A depicts fabricating an electrically switchable array, resulting from exposure to projected light, according to an example embodiment of the present disclosure.

FIG. 1A depicts fabricating an electrically switchable array, resulting from exposure to projected light, according to an example embodiment of the present disclosure.

Precursor mixture 101 includes a monomer, photo initiator and liquid crystal. The photoinitator may tune polymerization of the monomers and/or the liquid crystals upon exposure to photons (e.g., light).

As will be described in further detail, the electrically switchable array 104 (also referred to herein as filter 104) is fabricated by placing precursor mixture 101 against a reflective surface 111 (with prism 102 over the precursor mixture 101) and exposing the precursor mixture 101 to incident light 103 (e.g., using a standard light projector). In some embodiments, a source of light or electromagnetic radiation is positioned proximate the precursor mixture. For example, as shown in the FIG. 1A, a source of incident light 103 (e.g., electromagnetic radiation 103) is positioned such that the precursor mixture 101 is positioned between the prism 102 and the reflection layer 111, with the source of incident light 103 striking the precursor mixture 101 at a specific angle, guided by prism 102.

As incident light 103 is reflected off of certain portions of the precursor mixture 101 a standing wave of electromagnetic radiation (not shown) is generated. In regions of high intensity of the standing light wave the precursor mixture 101 photopolymerizes, such that the liquid crystals phase and polymerizing monomer of the precursor mixture 101 form periodically varying nanoscale refractive index variations with a period defined by the standing light wave. This transforms the initial precursor mixture 101 into a nanostructured volume of two chemically distinct alternating layers, one layer type rich in liquid crystal phase (107a,b) and the other layer type rich in polymer (109a,b,c). These alternating layers of polymer-dispersed liquid crystal (107a, b) are distinct in their average chemical composition from the polymer layers and hence have a different refractive index. This structure therefore acts as a distributed Bragg reflectors and can also be formed in the morphology of 2D or 3D photonic architectures.

The generated alternating polymer-dispersed liquid crystal regions 107a-c and the generated alternating polymer layers 109a-c are different from each other and have different refractive indexes.

The refractive index variations described above may have any suitable size or arrangement. In some embodiments, the refractive index variations comprise an array (e.g., a 1-D array, a 2-D array, a 3-D array) of periodic and/or repeating features. The refractive index variations may have a regular or periodic characteristic dimension (e.g., a spacing between each variation, a period of the refractive index variations). In some embodiments, the spacing between the refractive index variations is less than or equal to 1 µm, less than or equal to 900 nm, less than or equal to 800 nm, less than or equal to 750 nm, less than or equal to 700 nm, less than or equal to 650 nm, less than or equal to 650 nm, less than or equal to 550 nm, less than or equal to 500 nm, less than or equal to 400 nm, less than or equal to 300 nm, less than or equal to 200 nm, or less than or equal to 100 nm. In some embodiments, the spacing between the refractive index variations is greater than or equal to 100 nm, greater than or equal to 200 nm, greater than or equal to 300 nm, greater than or equal to 400 nm, greater than or equal or 500 nm, greater than or equal to 550 nm, greater than or equal to 600 nm, greater than or equal to 650 nm, greater than or equal to 700 nm, greater than or equal to 750 nm, greater than or equal to 800 nm, or greater than or equal to 900 nm. Combinations of the foregoing ranges are also possible (e.g., less than or equal to 1 µm and greater than or equal to 100 nm). Other ranges are possible as this disclosure is not limited to the description provided herein.

In some embodiments, two or more sets of refractive index variations (e.g., nanoscale refractive index variations) may be present within the precursor mixture 101 (e.g., within the liquid crystal region of the precursor mixture). For example, a liquid crystal region of the precursor mixture 101 may comprise a first set of refractive index variations (e.g., within a first sublayer of the liquid crystal region 107a) with a first characteristic dimension and a second set of refractive index variations (e.g., within a second sublayer of the liquid crystal region 107b). In some embodiments, the liquid crystal region comprises a plurality of refractive index variations. In some embodiments, the liquid crystal region comprises of 2 sets, 3 sets, 4 sets, 5 sets, 6 sets, 7 sets, 8 sets, 9 sets, or 10 sets of refractive index variations. In some embodiments, the liquid crystal region comprises 20 sets, 50 sets, 100 sets, or 1000 sets of refractive index features, each of which may occupy a sublayer (e.g., a 20th sublayer, a 50th sublayer, a 100th sublayer, a 1000th sublayer) of the liquid crystal region.

In some embodiments, a particular amount of incident light is reflected by the formed photonic structure 104. In some embodiments, at least 50%, at least 60%, at least 70%, at least 80%, at least 85%, at least 90%, or at least 95% of the incident light is reflected by the formed photonic structure 104. In some embodiments, no greater than 95%, no greater than 90%, no greater than 85%, no greater than 80%, or no greater than 70% of the incident light is reflected by the formed photonic structure 104. Combinations of the foregoing range are also possible (at least 50% and no greater than 95%). Other ranges are possible. In some embodiments, the reflected light is of a particular wavelength or has a maximum at a particular wavelength.

As shown in FIG. 1A, electrically switchable array 104 may include a first polymer layer 109a, a second polymer layer 109b and a third polymer layer 109c, where a first polymer-dispersed liquid crystal region 107a is embedded between the first polymer layer 109a and second polymer layer 109b and a second polymer-dispersed liquid crystal region 107b is embedded between the second polymer layer 109b and third polymer layer 109c.

As is described above, in some embodiments, the polymer-dispersed liquid crystal layers embedded in the photonic array 104 allow to induce a shift in position and magnitude of the spectral reflectance peaks as a function of the applied electrical voltage, as shown in FIGS. 2C and 2D.

The electrical response of the electrically switchable material is due in part to the optical characteristics of the polymer-dispersed liquid crystal region. The molecules in the polymer-dispersed liquid crystal region, i.e. the liquid crystal elements, are rod-like in shape. The optical characteristics of the liquid crystal phase are dependent on the orientation of the rod-like molecules. This orientation can be changed by applying an electric field, which changes the optical characteristics of the liquid crystal phase, such as the refractive index. In some embodiments, the electrically switchable photonic array 104 described herein can be integrated over a conventional CMOS sensor in a camera to capture images at low light levels with improved SNR. In other embodiments, the electrically switchable array 104 is an add-on element or "replacement" element for existing hardware that functions as a camera or is a camera. As such, the electrically switchable array 104 can be designed to be compatible with conventional image sensors, although the achieved resolution after integrating the electrically switchable array 104 exceeds conventional image sensors. Taking advantage of the increased performance, the electrically switchable array 104 in accordance with embodiments of the invention may include fewer pixels to obtain equal or better quality images compared to conventional image sensors.

Alternatively, the size of the pixels that are captured may be reduced compared to pixels in conventional image sensors while achieving better results.

The optical fabrication time of the electrical switchable photonic array 104 can be between seconds and minutes, depending on the lighting conditions and the size of the exposed area in which the images are recorded. Using high-power projection systems, a reduction of the exposure time down to sub-second levels may be expected as the exposure time scales inversely with the light-exposure level. Of the various technical benefits to be illustrated in more detail are the easily controlled parameters that determine the optical properties of the final electrically switchable array 104.

First, during manufacture of the array from the precursor mixture 101, the spatial color distribution of the incident light defines the spatial distribution of the period of refractive index variations in the generated filter structure 104, also referred to herein as electrically switchable array 104. Referring to FIG. 1B, in the predicted reflection spectra graphs, a high peak reflectivity of up to 90% of incident light in the primary color regions that match with the red, green and blue channels of the incident light is shown.

The second key parameter may be the structure of the liquid crystal region which determines the electrical tunability caused by an applied voltage.

Nobody skilled in the art would have chosen the combination presented herein. For example, in holography spatially coherent light is generally essential. With regards to Lippman photography, the methods generally work with smooth mirror surfaces (e.g., Lippmann used a pool of liquid mercury for the smoothest possible surface).

In some embodiments of the present invention, spatially incoherent light 103 is combined with a rough back reflector 111 to create the standing wave patterns in a precursor mixture 101. It is not known that this has been done before nor would this combination be straightforward to deduce to those skilled in the art. Further, the material described herein goes beyond the scope of what exists in terms of optical control, electrical control and the achievable dynamics.

Various embodiments described herein may include refractive index variations within the photonic array 104. Without wishing to be bound by any particular theory, one or more surfaces of the periodic variations may cause a partial reflection of incident light waves, and for light waves whose wavelengths are relatively close to the dimensions of the variations, the reflections may combine by constructive interference, such that the periodic variations act as distributed Bragg reflectors (DBR). The refractive index variations may act as an optical filter by reflecting certain optical waves while not reflecting certain other optical waves. As described in more detail below, the wavelengths of light that are reflected or not reflected may be tuned by the spacings of the refracted index variations. In other embodiments, they might also act as optical waveguides.

FIG. 1B depicts intensity distribution in the standing wave used to generate the photonic array 104, the resulting approximated spatial refractive index variations in the photonic array 104 and the predicted reflection spectra, according to an example embodiment of the present disclosure.

As incident light 103 passes through the precursor mixture 101 and is reflected (i.e., reflected light 105) by the reflection layer 111, a standing wave of electromagnetic radiation is formed. The intensity distributions in the standing wave are shown in FIG. 1B. The standing wave of electromagnetic radiation (i.e. photons of light from the standing wave) interacts (e.g., cause a reaction) within the precursor mixture 101 such that it optically patterns the precursor mixture 101 (as described above) with nanoscale refractive index variations shown in FIG. 1C. In some embodiments, the precursor mixture 101 is polymerized (e.g., by electromagnetic radiation emanating from a source of electromagnetic radiation), forming a polymer matrix 104 as shown in FIG. 1A, which comprises the nanoscale refractive index variations. FIG. 1D displays the predicted reflection spectra of a photonic structures with refractive index distribution shown in FIG. 1C inscribed with light fields that exhibit the light intensity distributions depicted in the same rows in FIG. 1B.

FIGS. 2A-2D depict turning the electrically switchable optical filter off and on.

Specifically, FIG. 2A depicts the electrically switchable array 104 described in FIG. 1A, in the "off" mode. When no electrical charge passes through the array, the rod-like molecules in the liquid crystal phase may be randomly aligned and the refractive index in the polymer-dispersed liquid crystal region (107) may be high (around 1.63, estimated by $(n_e+n_o)/2$, where $n_e=1.72$ and $n_o=1.53$). The refractive index in the polymer phase (109) may be about 1.5. This results in an effective refractive index difference between the liquid crystal phase-containing layers and the polymer layers of around 0.1-0.15. As shown in the corresponding graph in FIG. 2C, when no voltage is applied the photonic array 104 reflects a maximum amount of light in a spectral band that is defined by the period of the photonic structure and the refractive index contrast. Consequently, the photonic array 104 transmits a minimum amount of light to an underlying detector in that spectral band.

FIG. 2B depicts the electrically switchable photonic array 104 described in FIG. 1A, in the "on" mode. When an electrical field is applied to the array, the rod-like molecules in the liquid crystal phase align with the field (107); the refractive index now experienced by normally incident light is $n_o=1.53$, which drastically reduces the refractive index difference to the adjacent polymer layers and suppresses the reflection band of the photonic structure. The photonic array (104) now transmits all incident light to an underlying detector. In some embodiments, the rod-like molecules exhibit an "ordered alignment" in the "on" mode.

Figure 3B:
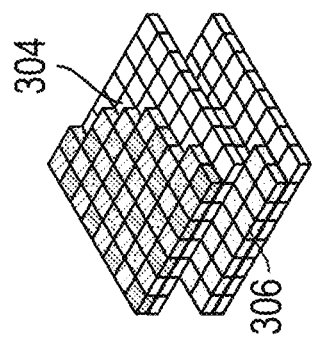
FIG. 3B depicts a first embodiment of an image stacking approach of the electrically switchable filter approach, according to an example embodiment of the present disclosure.
Figure 3A:
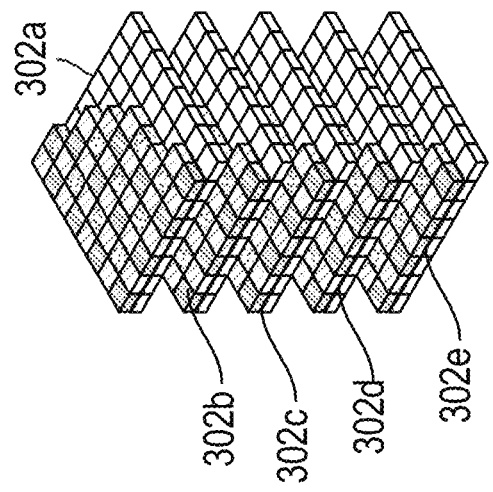
FIG. 3A depicts a conventional image stacking approach, according to an example embodiment of the present disclosure.

FIG. 3A depicts a conventional image stacking approach, according to an example embodiment of the present disclosure. Five RGB images 302a-302e are depicted, specifically first image 302a, second image 302b, third image 302c, fourth image 302d and fifth image 302e. Although five images are shown, several images (e.g., more than five) may be captured in the conventional approach for image acquisition. Capturing several RGB images and combining them can be cumbersome and time consuming. This conventional approach can lead to blurring and/or image artifacts, as well as making the overall frame rate too slow for low-light video. A method is needed to increase the amount of light the camera filters transmit and the sensors can capture. Although the method described herein is not limited to low-light photography and video, it is useful in such conditions.

FIG. 3B depicts a first embodiment of an image stacking approach of the electrically switchable filter approach, according to an example embodiment of the present disclosure. By integrating the electrically switchable filter 104 in a conventional RGB image sensor, an RGB image sensor can capture more light by switching between an RGB filter array when the electric field is off and a transparent element when the electric field is on. When the electrically switchable array is off, the RGB image sensor can capture an RGB image for true color data. When the electrically switchable array is on, the RGB image sensor can capture a monochrome image for luminance information with increased SNR. As such, an RGB image 304 can be combined with a monochrome image 306 to generate a final image with color information and improved SNR. The process and corresponding algorithm for combining the images 304 and 306 are discussed in more detail in FIG. 8. The embodiment depicted in FIG. 3B can reduce image acquisition time by over 50%.

Figure 4:
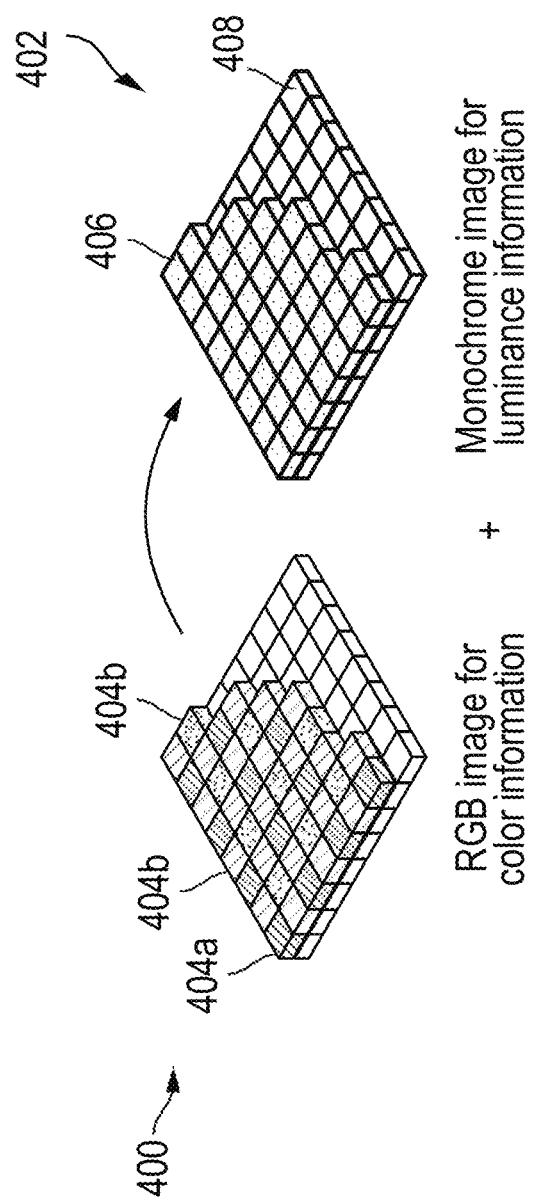
FIG. 4 depicts an RGB image and monochrome image for combining into a single image, according to an example embodiment of the present disclosure.

FIG. 4 depicts an RGB image and monochrome image for combining into a single image, according to an example embodiment of the present disclosure. A series of pixels may form RGB image 400. For example, RGB image 400 may include blue pixel 404a, green pixel 404b and red pixel 404b, which in addition to a series of other pixels, may be combined to form an RGB image 400. Monochrome image 402 may only include luminance information 402, including a series of white pixels (e.g., white pixel 406) and a series of black pixels (e.g., black pixel 408). As such, the method described herein to form a final frame may only require one RGB image and one monochrome image.

FIGS. 5A-5B depict sensitivity curves of a CMOS sensor with a Bayer RGB filter and CMOS sensor without such a filter. As shown, a lot of the incident light intensity never reaches the CMOS sensor with a Bayer filter, since the filter absorbs it. As described previously, adopting the method described herein that provides for tunability of turning the filter off and capturing an RGB image and turning the filter on and capturing a monochrome image can provide maximum light capture capabilities for shorter acquisition times.

Figure 6:
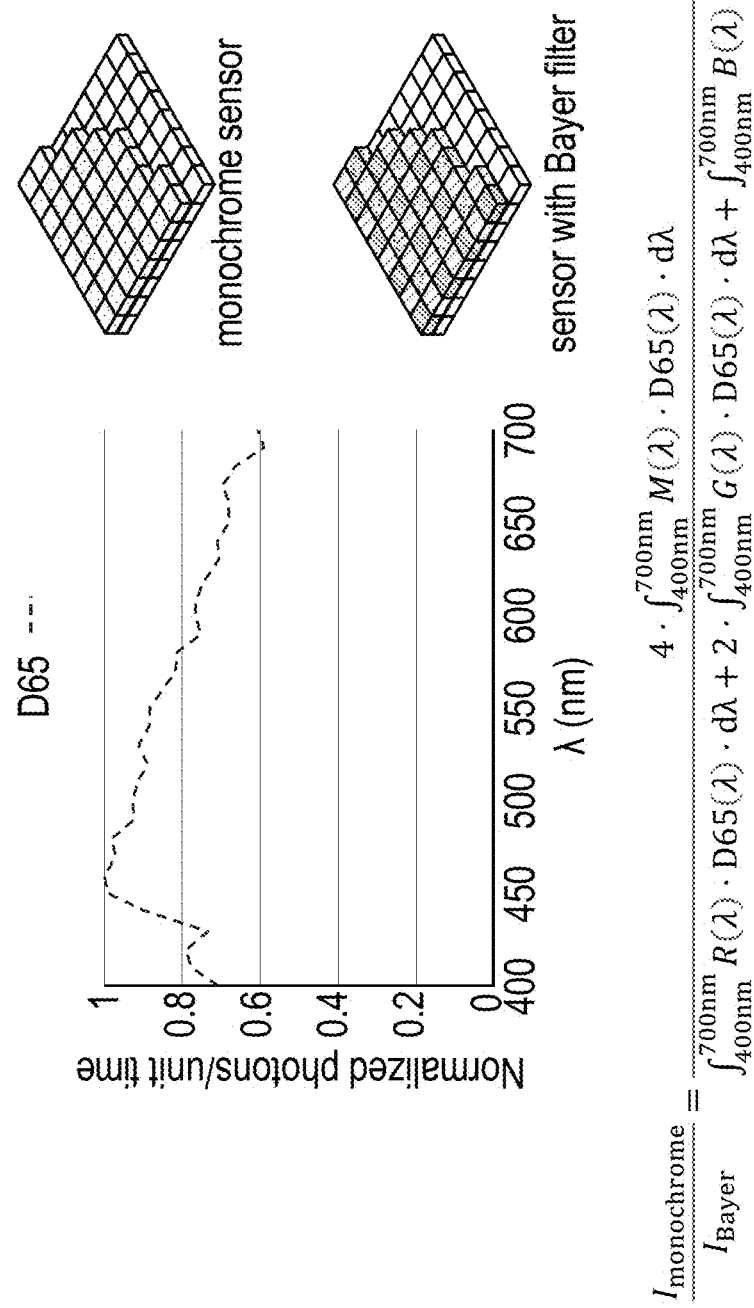
FIG. 6 depicts the light spectrum of a D65 illuminant and the improvement in photon capture that can be achieved with a monochrome image over an image acquired through a Bayer filter, according to an example embodiment of the present disclosure.

FIG. 6 depicts the light spectrum of a D65 illuminant and the ratio of light collected from a D65 illuminant by a sensor with a Bayer RGB filter and by a monochrome sensor without that filter. The monochrome sensor collects 2.4 times more light than the sensor with a Bayer filter, according to an example embodiment of the present disclosure. For the D65 illuminant the ratio between the intensity detected by a monochrome sensor and a sensor with a Bayer filter is given by $$\frac{I_{monochrome}}{I_{Bayer}} = \frac{4 \cdot \int_{400\,nm}^{700\,nm} M(\lambda) \cdot D65(\lambda) \cdot d\lambda}{\int_{400\,nm}^{700\,nm} R(\lambda) \cdot D65(\lambda) \cdot d\lambda + 2 \cdot \int_{400\,nm}^{700\,nm} G(\lambda) \cdot D65(\lambda) \cdot d\lambda + \int_{400\,nm}^{700\,nm} B(\lambda) \cdot D65(\lambda) \cdot d\lambda} = 2.4$$

Figure 7:
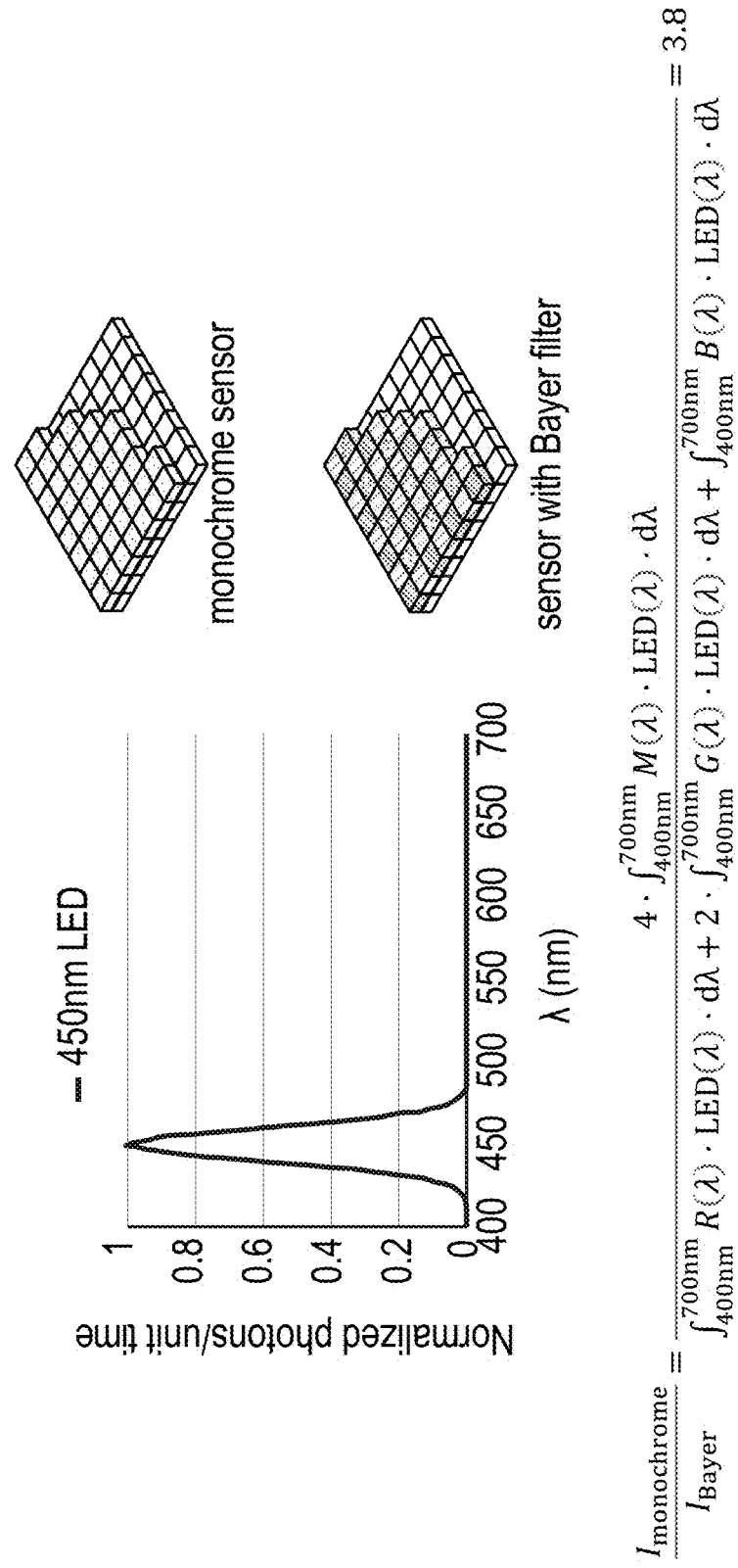
FIG. 7 depicts the light spectrum of a 450 nm illuminant and the improvement in photon capture that can be achieved with a monochrome image over an image acquired through a Bayer filter, according to an example embodiment of the present disclosure.

FIG. 7 depicts the light spectrum of a 450 nm LED illuminant and the ratio of light collected from this LED by a sensor with a Bayer RGB filter and by a monochrome sensor without that filter. For this illumination spectrum the monochrome sensor collects 3.8 times more light than the sensor with a Bayer filter, according to an example embodiment of the present. For the 450 nm LED the ratio between the intensity detected by a monochrome sensor and a sensor with a Bayer filter is given by $$\frac{I_{monochrome}}{I_{Bayer}} = \frac{4 \cdot \int_{400\,nm}^{700\,nm} M(\lambda) \cdot LED(\lambda) \cdot d\lambda}{\int_{400\,nm}^{700\,nm} R(\lambda) \cdot LED(\lambda) \cdot d\lambda + 2 \cdot \int_{400\,nm}^{700\,nm} G(\lambda) \cdot LED(\lambda) \cdot d\lambda + \int_{400\,nm}^{700\,nm} B(\lambda) \cdot LED(\lambda) \cdot d\lambda} = 3.8$$

Figure 8:
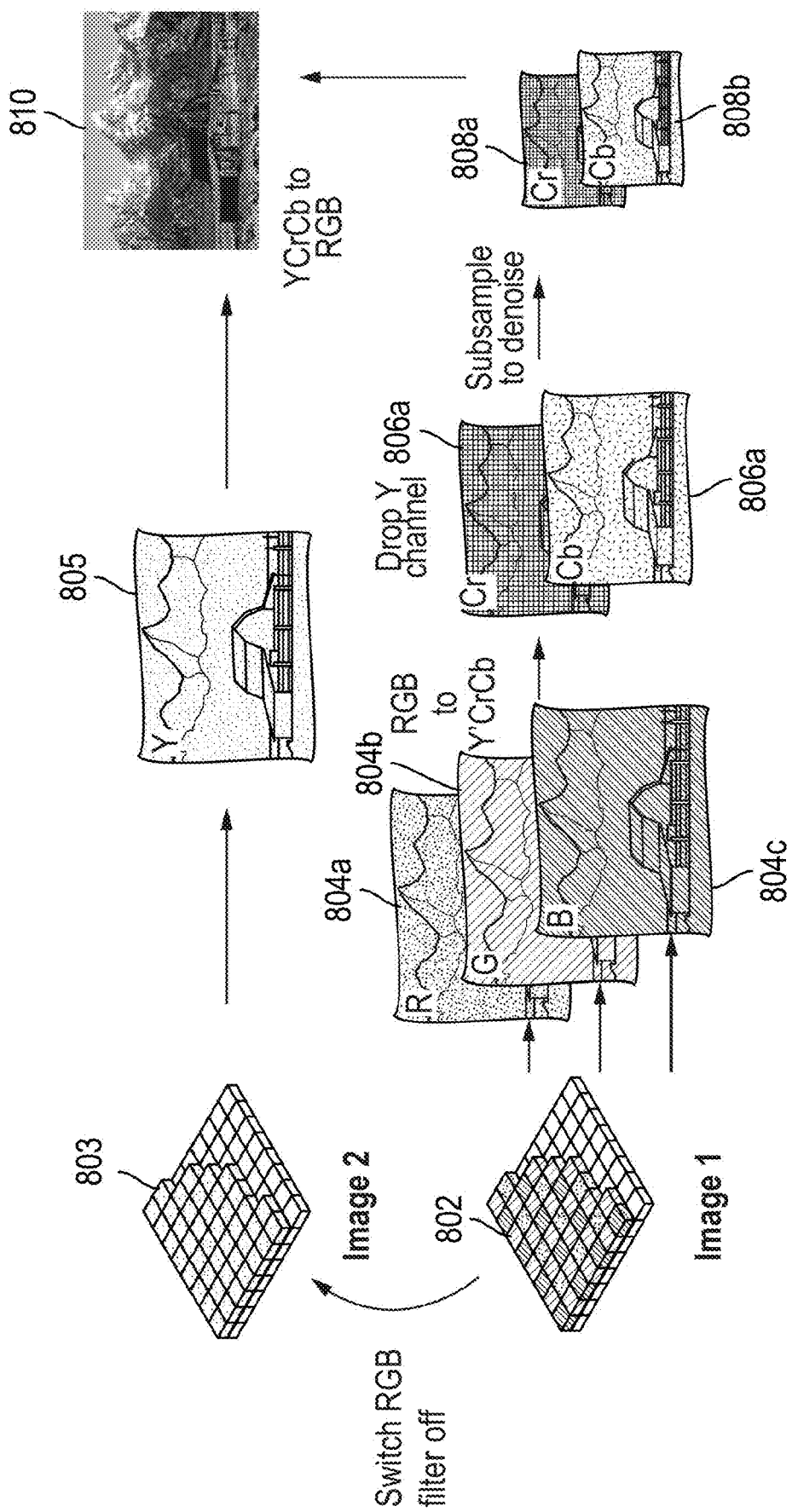
FIG. 8 depicts a data processing and image reconstruction method for building a color image from a low-quality/low SNR Bayer-filtered color picture and a high SNR monochrome image, according to an example embodiment of the present.

FIG. 8 depicts the process of image formation, according to an example embodiment of the present. The start of the exposure periods for the imager in a camera, for example, may be staggered in an overlapping manner so that the scenes are sampled sequentially.

In this method, a scene may be captured in a first image (e.g., image 802) by an imager with the electrically switchable array 104 turned on. Image 802 may provide RGB values (e.g., red image 804a, green image 804b and blue image 804c). The same scene captured in image 802 may also be captured with the monochrome filter turned on (e.g., image 803) to receive light intensity values in frame 805.

The RGB values (e.g., red image 804a, green image 804b and blue image 804c) captured by first image 802 may be used to generate an image in the Y'CrCB color space. Next, the Y channel in the Y'CrCb frame may be removed to form a Cr frame 806a and Cb frame 806b. The Cr frame 806a and Cb frame 806b can be subsampled to generate denoised Cr frame 808a and denoised Cb frame 708b.

Finally, the Cr frame 808a and Cb frame 808b may be combined with frame 805 (e.g., light intensity values) to reconstruct the original scene captured by an imager in image 802 and image 803, to generate a final image 810 with higher SNR than the standard RGB image 802 acquired with a standard Bayer filter.

Figure 9:
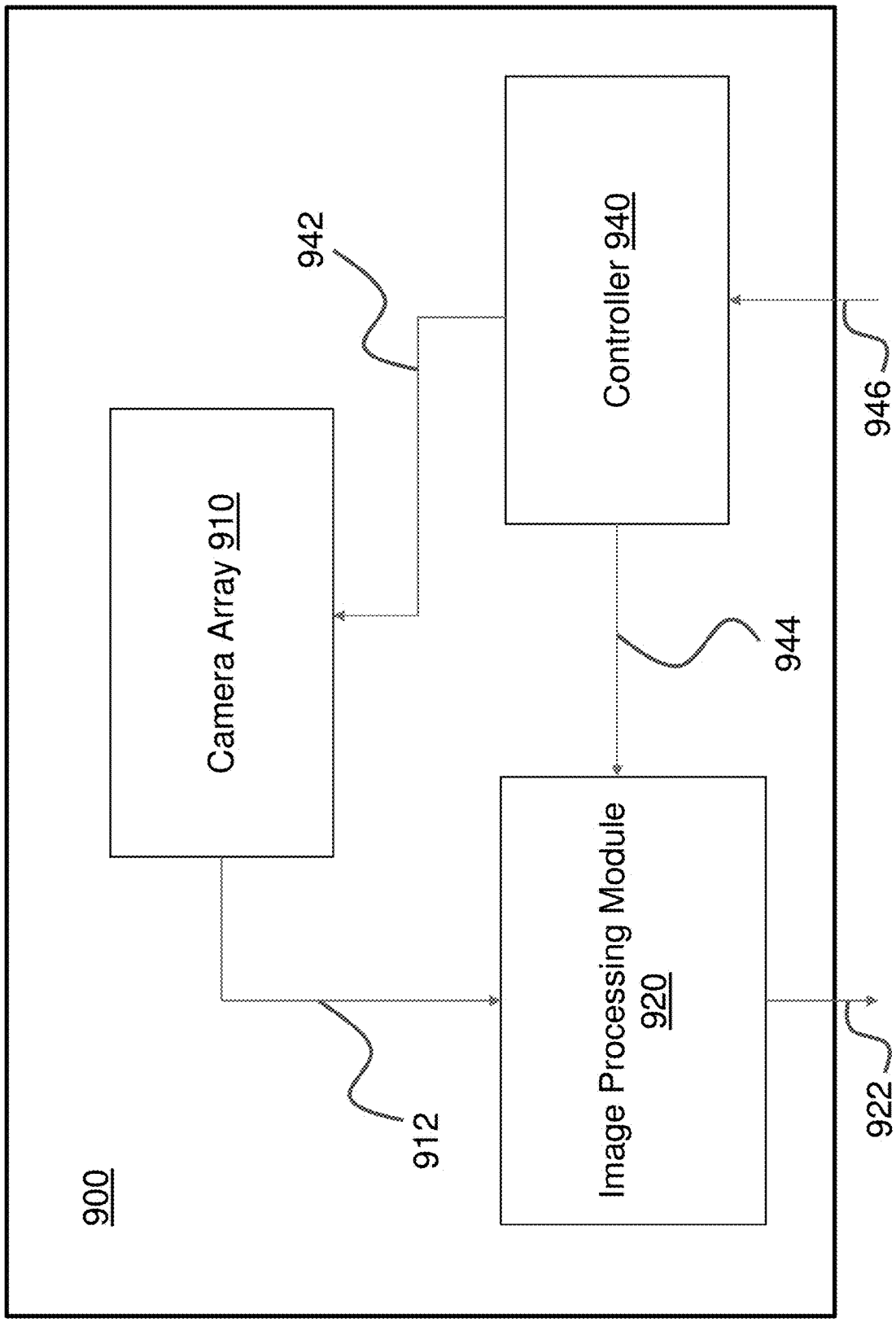
FIG. 9 is a functional block diagram for an imaging device, according to an example embodiment of the present disclosure.

FIG. 9 is a functional block diagram for an imaging device, according to an example embodiment of the present.

The imaging system 900 may include, among other components, the camera array 910 (e.g., electrically switchable photonic filter array 104 integrated over CMOS sensor), an image processing pipeline module 920 and a controller 940. The camera array 910 includes imagers. Images 912 are captured by the imagers in the camera array 910.

The controller 940 is hardware, software, firmware or a combination thereof for controlling various operation parameters of the camera array 910. The controller 940 receives inputs 946 from a user or other external components and sends operation signals 942 to control the camera array 910. The controller 940 may also send information 944 to the image processing pipeline module 420 to assist processing of the images 912.

The image processing pipeline module 920 is hardware, firmware, software or a combination for processing the images received from the camera array 910. The image processing pipeline module 920 processes multiple images 912, for example, as described below in detail with reference to FIG. 5. The processed image 922 is then sent for display, storage, transmittal or further processing.

The image processing pipeline module 920 may include, among other components, an upstream pipeline processing module, an image pixel correlation module, a parallax confirmation and measurement module, a parallax compensation module, a super-resolution module, an address conversion module, an address and phase offset calibration module, and a downstream color processing module. The address and phase offset calibration module is a storage device for storing calibration data produced during camera array characterization in the manufacturing process or a subsequent recalibration process. In several embodiments, the calibration data can indicate mapping between the addresses of physical pixels in the imagers and the logical addresses of an image. In other embodiments, a variety of calibration data appropriate to a specific application can be utilized in the address and phase offset calibration module.

The address conversion module performs normalization based on the calibration data stored in the address and phase offset calibration module. Specifically, the address conversion module converts "physical" addresses of the individual pixels in the image to "logical" addresses of the individual pixels in the imagers or vice versa. In order for super-resolution processing to produce an image of enhanced resolution, the phase difference between corresponding pixels in the individual imagers needs to be resolved. The super-resolution process may assume that for each pixel in the resulting image the set of input pixels from each of the imager is consistently mapped and that the phase offset of the image captured by each imager is already known with respect to the position of the pixel in the resulting image. Alternatively, the pixel offsets can be estimated prior to the super resolution process. The address conversion module resolves such phase differences by converting the physical addresses in the images into logical addresses of the resulting image for subsequent processing.

The images captured by the imagers are provided to the upstream pipeline processing module. The upstream pipe processing module may perform one or more of normalization of the color planes, Black Level calculation and adjustments, fixed noise compensation, optical PSF (point spread function) deconvolution, noise reduction, lateral color correction and crosstalk reduction.

In one embodiment, the upstream pipeline processing module also performs temperature normalization. Temperature normalization corrects for changes in the refractive index of the optical components through which the imagers receive light that result from changes in the temperature of the camera during use. In several embodiments, the temperature normalization process involves determining the temperature of the camera array by measuring the dark current of one or an average of a number of the camera array's imagers. Using this measurement, a refractive index normalization is performed by picking the correct point spread function from temperature calibration data. Different point spread functions may be obtained during a temperature dependent refractive index characterization of the camera during manufacture, and stored in the imaging system for use in the temperature normalization process.

Figure 10:
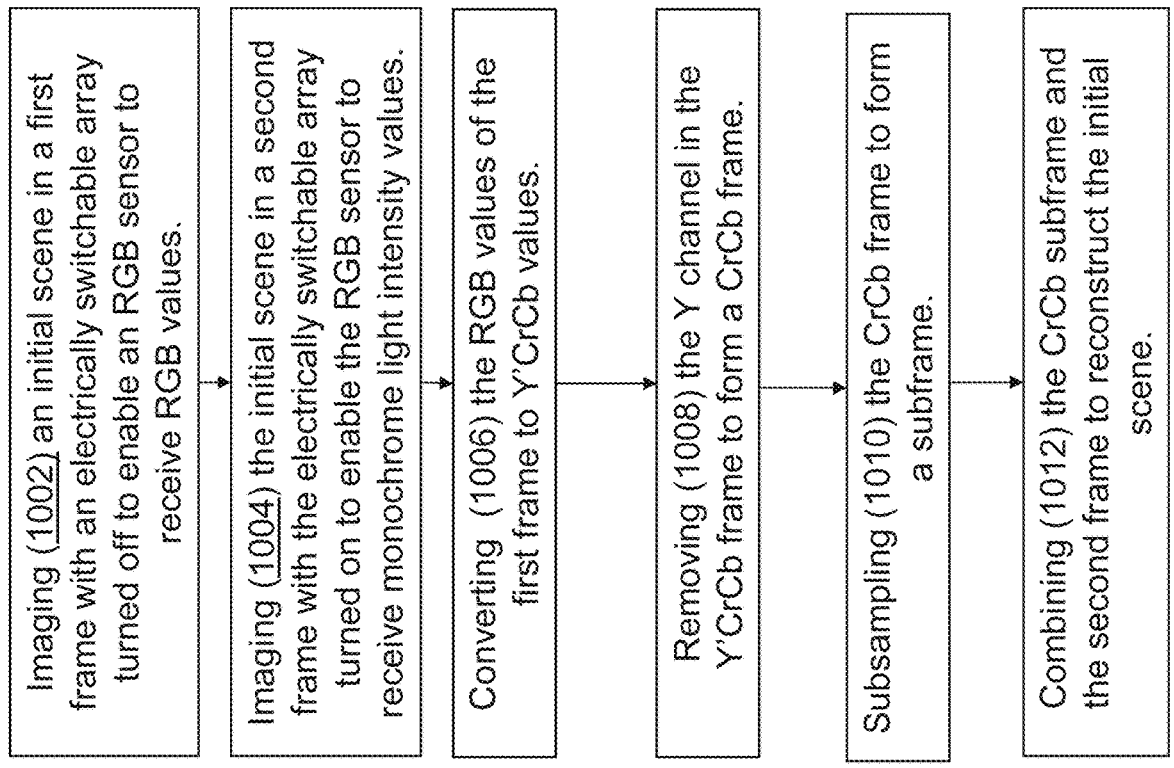
FIG. 10 is a flow chart, according to an example embodiment of the present disclosure.

FIG. 10 is a flow chart, according to an example embodiment of the present disclosure. At block 1002, an initial scene is imaged in a first frame with an electrically switchable array turned off to enable an RGB sensor to receive RGB values. At block 1004, the initial scene is imaged in a second frame with the electrically switchable array turned on to enable the RGB sensor to receive monochrome light intensity values. The RGB values of the first frame are converted to Y'CrCb values at block 1006. The Y channel is removed in the Y'CrCb frame to form a CrCb frame at block 1008. The CrCb frame is subsampled at block 1010 to form a subframe. The CrCb subframe and the second frame are combined at block 1012 to reconstruct the initial scene.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the scope of the present disclosure.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the present disclosure. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the present disclosure refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

The advantage of the device and method described here is, among other aspects, an improvement in the light sensitivity of CMOS sensors without the complex, slow, and expensive process of improving the underlying materials. In some embodiments, this combined with computational photography approaches, but due to the fewer images required is faster and less prone to image artifacts.

The embodiments described herein are all example embodiments, and thus, the disclosure is not limited thereto, and may be realized in various other forms. Each of the embodiments provided in the following description is not excluded from being associated with one or more features of another example or another embodiment also provided herein or not provided herein but consistent with the disclosure. For example, even if matters described in a specific example or embodiment are not described in a different example or embodiment thereto, the matters may be understood as being related to or combined with the different example or embodiment, unless otherwise mentioned in descriptions thereof. In addition, it should be understood that all descriptions of principles, aspects, examples, and embodiments of the disclosure are intended to encompass structural and functional equivalents thereof. In addition, these equivalents should be understood as including not only currently well-known equivalents but also equivalents to be developed in the future, that is, all devices invented to perform the same functions regardless of the structures thereof. For example, channel layers and sacrificial layers described herein may take a different type or form as long as the disclosure can be applied thereto.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c. Herein, when a term "same" is used to compare a dimension of two or more elements, the term may cover a "substantially same" dimension.

It will be understood that, although the terms $1^{st}$, $2^{nd}$, $3^{rd}$, $4^{th}$, etc. may be used herein to describe various elements, these elements should not be limited by these terms. These terms are only used to distinguish one element from another element. Thus, a $1^{st}$ element discussed below could be termed a $2^{nd}$ element without departing from the teachings of the disclosure.

It will be also understood that, even if a certain step or operation of manufacturing an apparatus or structure is described later than another step or operation, the step or operation may be performed later than the other step or operation unless the other step or operation is described as being performed after the step or operation.

Many embodiments are described herein with reference to cross-sectional views that are schematic illustrations of the embodiments (and intermediate structures). As such, variations from the shapes of the illustrations as a result, for example, of manufacturing techniques and/or tolerances, are to be expected. Thus, the embodiments should not be construed as limited to the particular shapes of regions illustrated herein but are to include deviations in shapes that result, for example, from manufacturing. Thus, the regions illustrated in the figures are schematic in nature and their shapes are not intended to illustrate the actual shape of a region of a device and are not intended to limit the scope of the present inventive concept. Further, in the drawings, the sizes and relative sizes of layers and regions may be exaggerated for clarity.

For the sake of brevity, conventional elements, structures or layer of optical devices may or may not be described in detail herein.

What is claimed is:

1. A photonic device including:
a filter comprising:
an electrically switchable array, wherein the electrically switchable array includes:
alternating layers of polymer and polymer-dispersed liquid crystal, wherein the electrically switchable array is tunable under an applied electric field; and
a Red-Green-Blue (RGB) image sensor, wherein the electrically switchable array is integrated into the RGB image sensor,
wherein fabricating the filter includes:
using spatially incoherent light combined with a rough back reflector to generate a standing wave pattern in a homogeneous liquid mixture, wherein the homogeneous liquid mixture is a precursor mixture including a monomer, photoinitiator and liquid crystal.

2. The photonic device of claim 1, wherein the alternating layers of polymer and polymer dispersed liquid crystal have distinctly different refractive index variations, wherein the refractive index variations are distributed Bragg reflectors.

3. The photonic device of claim 1, wherein:
(a) at zero applied voltage the filter exhibits a high refractive index contrast between the polymer layers and the polymer-dispersed liquid crystal layers and is therefore strongly reflective in a wavelength range determined by the structural period of the alternating layers; and
(b) applying voltage greater than zero across the filter leads to a suppression of the refractive index contrast making the filter transparent in the previously reflected wavelength range.

4. The photonic device of claim 1, wherein the RGB image sensor is configured to:
a) capture a color image when the electrically switchable array is switched off; and
b) capture a monochrome image when the electrically switchable array is switched on.

5. The photonic device of claim 1, wherein fabricating the filter includes:
exposing a homogeneous liquid mixture comprising of holographic polymer and liquid crystal to a light source;
generating periodic light fields; and
generating, from the periodic light fields, liquid-liquid phase separation of the polymer-dispersed liquid crystal and simultaneously generating cross-linking of the polymer layer.

6. A method of imaging, the method comprising:
imaging a scene in a first frame with a Bayer filter to receive RGB values, wherein the Bayer filter includes a Red-Green-Blue (RGB) image sensor and an electrically switchable array integrated into the RGB image sensor, and wherein the electrically switchable array is turned off to receive the RGB values;
imaging the scene in a second frame with the electrically switchable array filter turned on to receive light intensity values,
converting the RGB values of the first frame to Y'CrCb values,
removing the Y channel in the Y'CrCb frame to form a CrCb frame,
subsampling the CrCb frame to form a subframe, and
combining the CrCb subframe and the second frame to reconstruct a final scene,
wherein fabricating the electrically switchable array includes:
using spatially incoherent light combined with a rough back reflector to generate a standing wave pattern in a homogeneous liquid mixture, wherein the homogeneous liquid mixture is a precursor mixture including a monomer, photoinitiator and liquid crystal.

* * * * *